United States Patent
Nakabayashi

(10) Patent No.: US 6,523,963 B2
(45) Date of Patent: Feb. 25, 2003

(54) HERMETICALLY SEALED DIFFRACTION OPTICAL ELEMENT AND PRODUCTION METHOD THEREOF

(75) Inventor: Masaaki Nakabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/938,573

(22) Filed: Aug. 27, 2001

(65) Prior Publication Data

US 2002/0024734 A1 Feb. 28, 2002

(30) Foreign Application Priority Data

Aug. 29, 2000 (JP) ........................................ 2000-258475

(51) Int. Cl.⁷ ............................... G02B 5/18; G02C 7/00
(52) U.S. Cl. ........................ 359/513; 359/507; 359/569; 359/576; 359/900; 359/565; 156/99; 156/107
(58) Field of Search ................................. 359/576, 507, 359/513, 565, 566, 569, 900, 742; 156/99, 104, 106, 107; 349/190, 193, 200, 201, 202

(56) References Cited

U.S. PATENT DOCUMENTS

| | | | | |
|---|---|---|---|---|
| 4,118,114 A | * | 10/1978 | Anderson et al. | 353/102 |
| 4,828,558 A | * | 5/1989 | Kelman | 351/166 |
| 4,966,447 A | * | 10/1990 | Huang et al. | 359/107 |
| 5,117,306 A | * | 5/1992 | Cohen | 351/161 |
| 5,152,788 A | * | 10/1992 | Isaacson et al. | 156/73.1 |
| 5,208,700 A | * | 5/1993 | Harris et al. | 359/558 |
| 5,446,588 A | * | 8/1995 | Missig et al. | 359/565 |
| 5,496,616 A | * | 3/1996 | Harris | 359/569 |
| 5,838,703 A | * | 11/1998 | Lebby et al. | 372/101 |
| 6,157,488 A | * | 12/2000 | Ishii | 359/565 |
| 6,236,515 B1 | * | 5/2001 | Yamamoto et al. | 359/684 |

FOREIGN PATENT DOCUMENTS

| | | | |
|---|---|---|---|
| EP | 1 001 301 A2 | * | 5/2000 |
| JP | 58-198007 A | * | 11/1983 |
| JP | 03-084514 A | * | 4/1991 |
| JP | 5-2151 | * | 1/1993 |
| JP | 10-123388 A | * | 5/1998 |
| JP | 10-133149 A | * | 5/1998 |
| WO | WO 99/38046 | * | 7/1999 |

OTHER PUBLICATIONS

Michael W. Farn et al., "Diffractive Doublet Corrected On–Axis at Two Wavelengths," 1354 *SPIE* 24–29(1990).
Carmiña Londoño et al., "The Design of Achromated Hybrid Diffractive Lens Systems," 1354 *SPIE* 30–37 (1990).

\* cited by examiner

*Primary Examiner*—John Juba, Jr.
(74) *Attorney, Agent, or Firm*—Fitzpatrick, Cella, Harper & Scinto

(57) ABSTRACT

The present invention provides a diffraction optical element comprising a first optical member having a first diffraction grating, a second optical member having a second diffraction grating, wherein the first and second optical members are stacked so that the first and second diffraction gratings face each other inside the stacked members and so that a space is formed between the diffraction gratings, and a sealing member for hermetically sealing the space between the diffraction gratings.

11 Claims, 6 Drawing Sheets

HERMETICALLY SEALED DIFFRACTION OPTICAL ELEMENT AND PRODUCTION METHOD THEREOF

BACKGROUND OF THE INVENTION

1. Field of the Invention

The present invention relates to a diffraction optical element, and in particular, to a diffraction optical element with a stacked structure having a grading structure, where luminous flux in an operating wave-length range is concentrated in a specific degree, and its production method.

2. Related Background Art

Conventionally, a chromatic aberration of an optical system is corrected by combining optical elements consisting of transparent materials whose dispersions are different from each other. Moreover, how to correct the chromatic aberration by using a diffraction optical system is disclosed in SPIE Vol. 1354, 24–37.

By the way, at the time of adding a diffraction surface that has a diffraction efficiency to the optical system that has a spectral characteristic, it is important to keep the diffraction efficiency high in an operating wavelength range. However, in a diffraction type optical system, light with a degree other than a design degree has a larger angle of diffraction as the degree is apart from the design degree, and the difference of focal distances becomes larger. Hence, this appears as defocus, and when light source with particularly high brightness exists, a side lobe may arise.

On the other hand, by constituting a diffraction optical element with a stacked structure that has multiple layers composed of two or more layers, remarkable enhancement can be expected in quality of the image and information, and it becomes possible to enhance optical performance. Such a diffraction optical element with a stacked structure that has two or more of layers is formed by staking and bonding a plurality of optical members that have each diffraction grating. Moreover, such an optical member is made by separating a compound from a molding die after dropping a compound on a molding die where a pattern corresponding to a diffraction grating is formed and transcripting the pattern to the compound.

A well-known method of forming a pattern on the surface of a molding die is a method using typical ultra-fine processing technology such as precision machining technology by photolithography, which is a semiconductor production process, or a diamond tool. It becomes possible to manufacture the above-described optical members by molding plastics or glass using the molding die in which those processing technologies form the pattern.

However, in order to achieve the performance that the above-described optical element is required to have, very high precision is required in the size of a diffraction grating and a refraction-index value in a whole visible range of the material that constitutes the diffraction grating. On the other hand, when diffusion into general consumption products that are relatively cheap is preferred, it is desired that molding using plastic materials produce optical elements. However, when the plastic material is used, molding transcription and optical stability of the material itself become measuringly important. In particular, severe durability is required at the time of using them as lenses for cameras or the like, and hence it becomes indispensable to guarantee the optical property of material. However, as compared with glass, it is known that a refraction index of a plastic material changes significantly with a change in temperature, moisture content, etc. In particular, when diffraction optical elements are produced from plastic material, the plastic greatly affects their diffraction characteristics, and hence, there is a possibility of worsening the image quality output of an optical instrument. A proposed diffraction optical element using plastic materials has already been set forth by Japanese Patent Application Laid-Open No. 9-127322 but measures against the environment resistance such as the above-described temperature change, moisture content, etc., are not taken into consideration by this publication.

SUMMARY OF THE INVENTION

An object of the present invention is to provide a diffraction optical element that can solve the above-described problems of conventional technologies, can respond to changes in a surrounding environment, and whose perform hardly degrades even if it is used for a long time; and a production method thereof.

Another object of the present invention is to provide a diffraction optical element comprising: a first optical member having a first diffraction grating; a second optical member having a second diffraction grating, wherein the first and second optical members are stacked so that the first and second diffraction gratings faces to each other inside the stacked members and so that a space is formed between the diffraction gratings; and a sealing member for hermetically sealing the space between the diffraction gratings.

Still another object of the present invention is to provide a method of producing a diffraction optical element, comprising the steps of: staking a first optical member having a first diffraction grating and a second optical member having a second diffraction grating so that the first and second diffraction gratings faces to each other inside the stacked members and so that a gap is formed between the diffraction gratings; and hermetically sealing a space between the diffraction gratings with a sealing member.

A further object of the present invention is to provide an optical system comprising a plurality of optical elements including the diffraction optical element as described above.

A still further object of the present invention is to provide an optical apparatus forming an image by using the optical system as described above.

DETAILED DESCRIPTION OF THE PREFERRED EMBODIMENT

Hereafter, the present invention will be described in detail with reference to the drawings.

A diffraction optical element of the present invention is made by bonding two optical members, each of which is equipped with a diffraction grating, so that the diffraction gratings face each other inside the bonded members and so that a space is formed between these diffraction gratings. Then, the space between diffraction gratings is hermetically sealed with a sealing member.

Generally, a diffraction grating with a stacked structure is composed of stacked diffraction optical elements with a minute gap therebetween. Hence, constant moisture exchange between a diffraction grating section and a space section, which is caused by changes in the environment surrounding the element, particularly by changes in the temperature, becomes a significant factor that causes changes in a refraction-index of the grid section. For this reason, it is necessary to reduce the moisture content of an entire grid section, molding section, and the space section as soon as and as much as possible. Moreover, in order to maintain the favorable moisture conditions, it is important how the above-described space section can block external moisture by sealing or the like. In general, when a sealing member has a thickness in a direction in which moisture permeates, it is possible to considerably suppress moisture permeability per fixed time. Hence, it is desirable to seal the edges of the element with a sealing member having sufficient width. Furthermore, it becomes possible to better hermetically seal the element by using the element with a sealing member combined with an element holder, etc. in one piece.

Embodiment 1

Figure 1A:
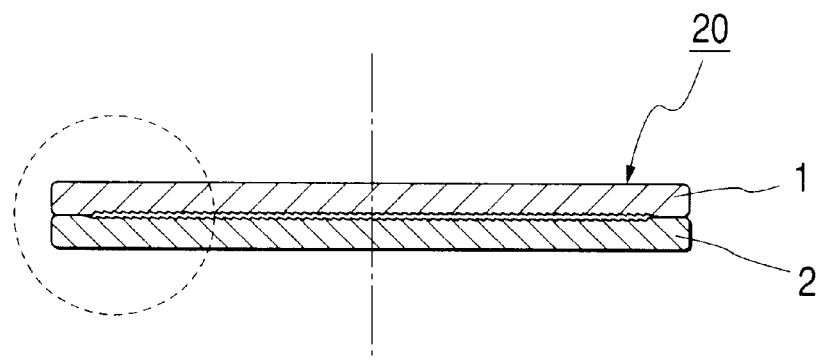
FIGS. 1A and 1B are schematic sectional views showing a diffraction optical element, which is composed of a first optical member and a second optical member, of Embodiment 1 according to the present invention.
Figure 1B:
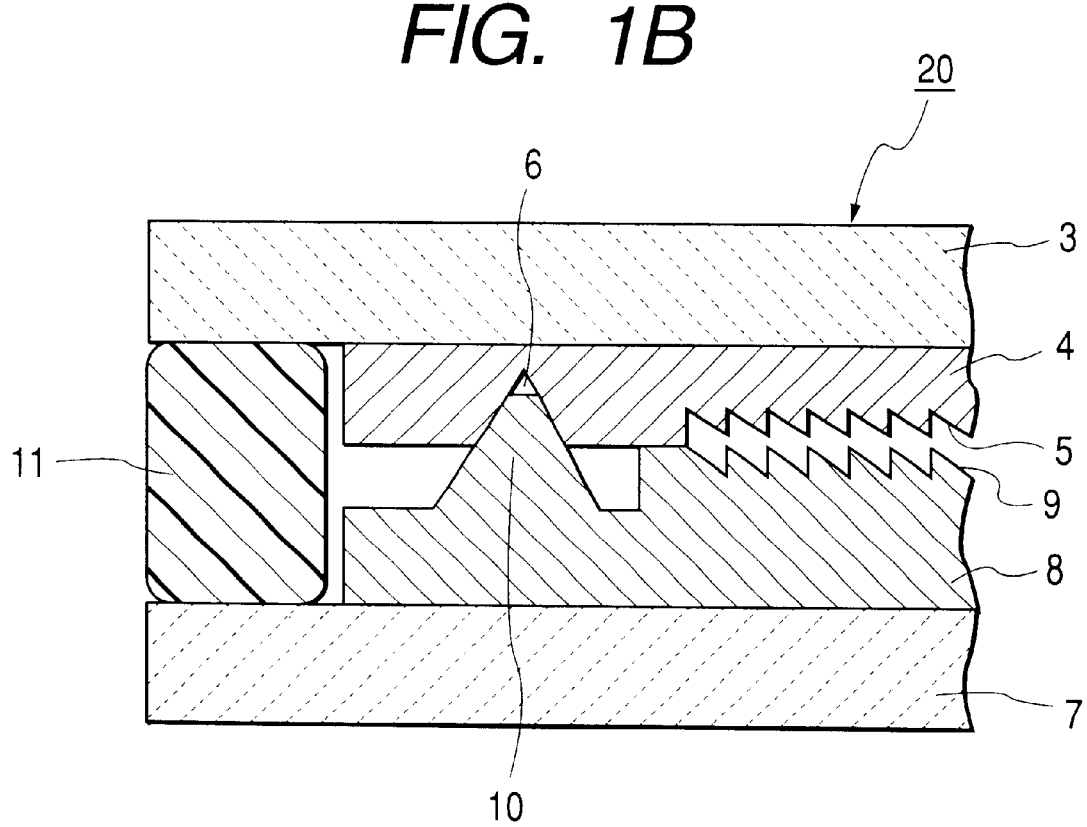

FIGS. 1A and 1B are schematic sectional views showing a diffraction optical element of Embodiment 1 according to the present invention. Here, FIG. 1A is a drawing of an entire diffraction optical element, and FIG. 1B is a partially enlarged view of the vicinity of an outer peripheral portion of the element shown in FIG. 1A.

In FIGS. 1A and 1B, a diffraction optical element 20 is formed by bonding a first optical member 1 and a second optical member 2 by stacking them. The optical member 1, as shown in FIG. 1B, is made by stacking a resin layer 4 consisting of a photo-curing resin on a glass substrate 3. On a surface of the resin layer 4, a first diffraction grating 5 with the blazed geometry that has a lens effect is formed. Moreover, in the resin layer 4 near the outer peripheral portion of the optical member 1, a concave part 6 for the alignment is provided. This concave part 6 consists of a groove whose cross-sectional geometry is V-shaped.

On the other hand, the optical member 2 is made by stacking a resin layer 8 consisting of a photo-curing resin on a glass substrate 7. On a surface of the resin layer 8, a second diffraction grating 9 with the blazed geometry that has a lens effect is formed. Moreover, in the resin layer 8 near the outer peripheral portion of the optical member 2, a convex part 10 for alignment is provided. This convex part 10 has the cross-sectional geometry that is triangular.

The above-described two optical members 1 and 2 are bonded so that the surfaces of the formed diffraction gratings are inside the bonded members and so that the concave part 6 and the convex part 10 fit each other. At this time, the diffraction optical element 20 is formed so that an air gap of 1.5 μm exists between the diffraction gratings 5 and 9. This air gap is hermetically sealed by a sealing member 11 that is poured in a gap between the optical members outside the convex part 10 and the concave part 6.

The resin layer 4 in which the first diffraction grating 5 is formed is composed of a photo-curing resin having a low refraction index and a small dispersion. Moreover, the resin layer 8 in which the second diffraction grating 9 is formed is composed of a photocuring resin having a high refraction index and a large dispersion. The materials of these resin layers are arbitrarily selected on the basis of an optical design among the combinations of two or more kinds of resin materials. Moreover, grid geometry such as grid height and a grid pitch is determined depending on the application of the diffraction optical element and the above-described resin material.

Figure 2A:
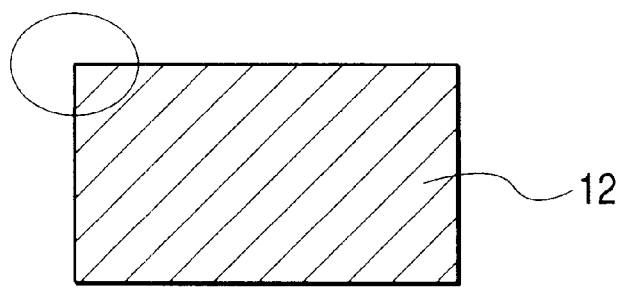
FIGS. 2A and 2B are schematic views showing a molding die for producing the second optical member shown in FIG. 1B.
Figure 2B:
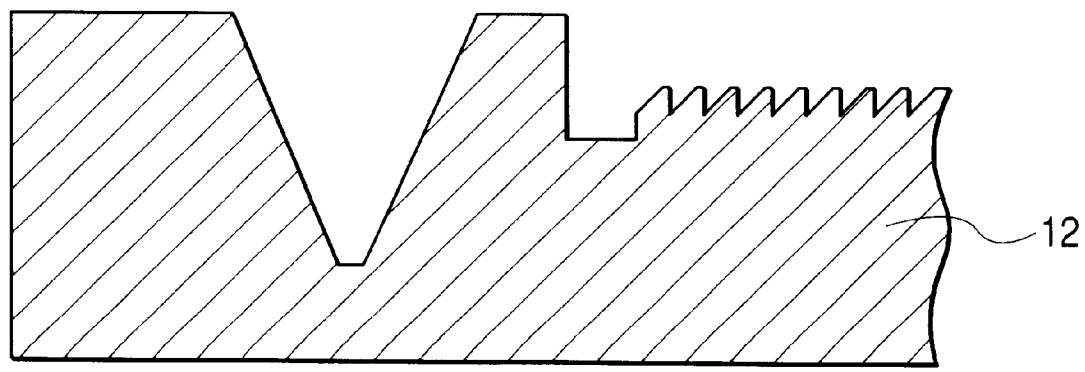

The above-described optical members 1 and 2 are formed by a molding method using a molding die. FIGS. 2A and 2B show a molding die 12 for producing the second optical member 2. Here, FIG. 2A is a schematic view of the entire molding die and FIG. 2B shows a partially enlarged sectional view of an area near the outer peripheral portion, which is identified by a circle in FIG. 2A. A grid pattern with the geometry corresponding to the second diffraction grating 9 was engraved on a surface of the molding die 12. Moreover, a V-shaped groove corresponding to the convex part 10 in the second optical member 2 was formed near the outer peripheral portion of the molding die 12.

Figure 3A:
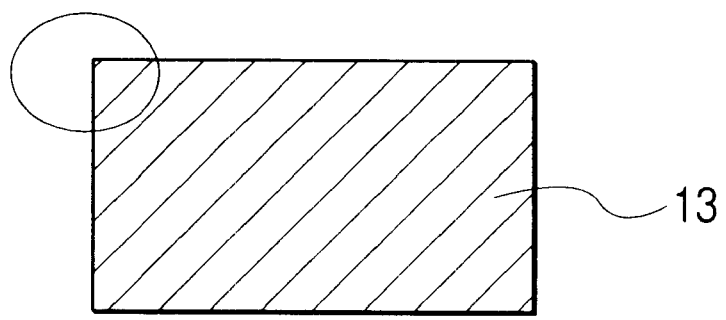
FIGS. 3A and 3B are schematic views showing a molding die for producing the first optical member shown in FIG. 1B.
Figure 3B:
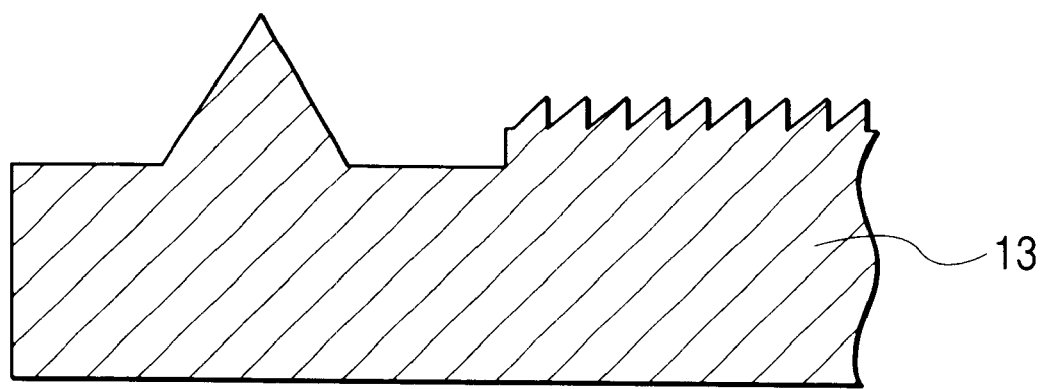

FIGS. 3A and 3B show a molding die 13 for producing the first optical member 1. Here, FIG. 3A is a schematic view of the entire molding die and FIG. 3B shows a partially enlarged sectional view of an area near the outer peripheral portion, which is surrounded with a circle in FIG. 3A. A grid pattern with the geometry corresponding to the first diffraction grating 5 was engraved on a surface of the molding die 13. Moreover, near the outer peripheral portion of the molding die 13, a triangular convex part corresponding to the concave part 6 in the first optical member 1 was formed.

The above-described molding dies 12 and 13 were produced by performing KN plating on cemented carbide to form a plated layer with a thickness of several 10 μm and by machining the plated layer with a diamond tool. In each molding die, concave or convex geometry was formed by machining on a circle that has the same center as that of a diffraction grating in an area other than an optical effective area. It is necessary that the geometry position of one of the two optical members from the center of the diffraction grating be equal to the other optical member. Positional errors of these concave and convex geometries were allowed to be nearly 1 μm, and hence it was possible to form the geometries by usual machining. In addition, in many cases, the concave and convex geometries are formed by combining geometries whose cross sections are V-shaped and semicircular, respectively. However, in positioning at a contact of a surface and a circle, it is actually difficult to machine them and to set up a gap between the diffraction gratings. For this reason, in this embodiment, as shown in FIG. 1B, a mountain-shaped extrusion (convex part 10) was incorporated to a V-shaped groove (concave part 6). It was easy to damage a top of the convex part 10 when incorporating the convex part 10, which was made to have a 5-micrometer flat section at its top.

Next, a process of molding the optical members using the above-described molding dies will be described. First, a photo-curing resin was dropped at the center of a face on which the grid pattern of the molding die 12 shown in FIGS. 2A and 2B was engraved. At this time, the amount of the dropped resin was controlled by a dispenser. After the resin spread to a grid pattern region and the concave part in the peripheral portion of the molding die, this molding die was put into a vacuum chamber to perform degassing while reducing a pressure within the chamber to nearly 10 mmHg. It is confirmed that when the grid geometry has a pitch of 40 $\mu$m and a grid height of nearly 10 $\mu$m, air bubbles accumulate in fine geometry when the resin spreads on the molding die. If such air bubbles accumulate, the molded optical member has a geometric defect. In this embodiment, due to the above-described degassing, it was possible to produce the optical member without generating such a geometrical defect.

After above-mentioned degassing, a small amount of a resin that was the same as the above-described resin was dropped at the center of a glass substrate 7 used as a substrate of the optical member 2 shown in FIG. 1B. Then, after contacting the resin on the molding die with the resin drop, the glass substrate was first lowered slowly and the glass substrate 7 was fixed in a position where the resin layer 8 had the desired thickness. Then, after radiating ultraviolet rays from an ultraviolet lamp through the glass substrate 7 to temporarily harden the resin, the entire resin layer 8 was released from the molding die 12 by pulling up the circumference of the glass substrate. In order to increase adherence to the resin layer 8, a silane coupling agent was applied to the surface of the glass substrate 7 with a spinner prior to contact with resin layer, and the glass substrate 7 was dried in an oven. Such a process was performed in a similar fashion using the molding die 13, and the optical member 1 shown in FIGS. 1A and 1B was also formed. Thus, two kinds of optical members (diffraction lens molded articles) with concave or convex geometry in their periphery were produced.

Since two kinds of optical members produced contained moisture in each resin layer, they were fully dried by a drying process. Owing to this drying process, in the diffraction optical element produced by bonding these optical members, it was possible to reduce to a minimum a change of the refraction index caused by moisture due to temperature changes. The drying process was performed by keeping the optical members in a low-humidity oven. It is also possible to dry the optical members by storing them in a vacuum chamber instead of the low-humidity oven. Moreover, such drying can be also performed after coating an antireflection film, etc. on a diffraction grating surface.

Figure 4:
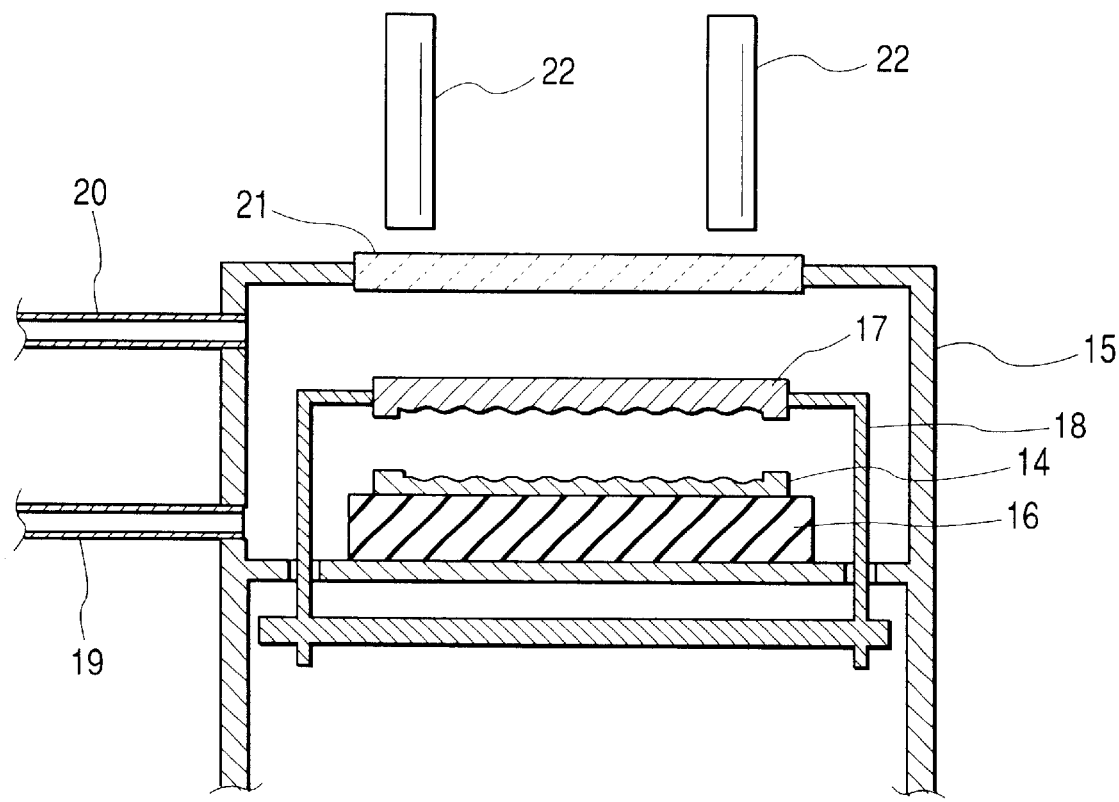
FIG. 4 is a schematic sectional view showing a bonding apparatus used for the junction of the optical members in Embodiment 1.

Next, the optical members formed as mentioned above are bonded as follows. FIG. 4 is a schematic sectional view showing a bonding apparatus used for bonding the optical members. First, one member 14 of the two kinds of optical members was set on a fixture 16 placed in a chamber 15 while setting up the side where the diffraction grating was formed. Then, outside the concave or convex geometry of this optical member 14, a thixotropic photo-curing adhesive agent having a low fluidity was dropped in several places in the circumferential direction.

Next, the other member 17 of the optical members was held with a gap from the optical member 14 by a support arm 18 so that the center of the member 17 was just above the center of the optical member 14. At this time, the side on which the diffraction grating of the optical member 17 was provided was lowered.

Subsequently, after performing evacuation from a vacuum piping 19 to evacuate the inside of the chamber 15, a nitrogen gas was supplied from the nitrogen piping 20 so that the inside of the chamber 15 reached atmospheric pressure. In this state, the support arm 18 was lowered to access the optical member 17 above the optical member 14. At this time, since interference fringes were observed in an area in which the diffraction grating was formed, the coarse control of the relative position between optical members was performed while referring to these interference fringes with the naked eye. Then, these optical members were stacked so that the circles of the concave and convex geometries formed in respective optical members overlapped. After that, ultraviolet rays were radiated from the ultraviolet lamp 22 onto the stacked optical members through the quartz glass plate 21 inserted in a window provided in the chamber 15 passed to temporarily fix these optical members by hardening the thixotropic adhesive described above.

Next, an epoxy-based thermosetting adhesive was poured in a gap around the two optical members, which were temporarily fixed, and the sealing member 11 shown in FIG. 1B was formed by hardening this adhesive to hermetically seal a space between diffraction gratings. As the adhesive that forms a sealing member, instead of the above-described thermosetting adhesive, a two-liquid thermosetting adhesive can be used.

It is desirable that, as the above-mentioned thixotropic adhesive and the adhesive forming the above-mentioned sealing member, an adhesive having a very small hardening shrinkage is used so as to avoid deformation of the diffraction optical elements as much as possible. However, even if such an adhesive is used, a local distortion may arise due to unbalanced hardening shrinkage in the temporarily fixed portion and other portions. This embodiment prevents the above-described face distortion by using an adhesive having flexibility comparable to that of the adhesive used for temporarily fixing the optical members.

Embodiment 2

A stacked type diffraction optical element was produced in the same manner as in Embodiment 1, except that optical members were temporarily fixed by using an epoxy-based ultraviolet-ray curing adhesive that is curable by cationic polymerization instead of the thixotropic system photo-curing adhesive used in Embodiment 1. Since the epoxy ultraviolet-ray curing adhesive, which is curable by cationic polymerization, had a relatively low moisture permeability, the epoxy ultraviolet-ray curing adhesive was applied to the entire perimeter of the optical members in a vacuum chamber to be able to seal the optical element.

Embodiment 3

Figure 5:
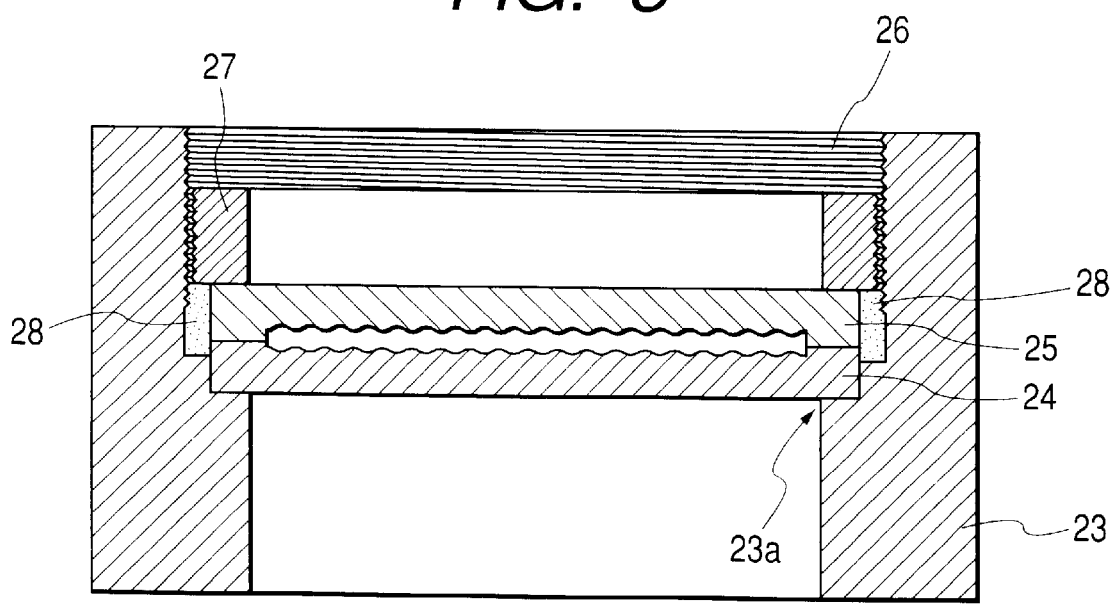
FIG. 5 is a schematic sectional view showing a diffraction optical element of Embodiment 2 according to the present invention.

As for this embodiment, a space between diffraction gratings is sealed with an element holder in one piece. FIG. 5 is a schematic sectional view showing a diffraction optical element of Embodiment 3 according to the present invention. In FIG. 5, numeral 23 denotes the cylindrical element holder consisting of a lens barrel of a camera. A step 23a is provided on the inside of the element holder 23, and as one of two optical members, the optical member 24 was inserted in this step 23a. Next, the other optical member 25 was stacked. At this time, an assembly was performed so that the diffraction grating formed in each optical member was inside and so that a space was formed between these diffraction gratings. Moreover, a gap is provided, as shown in FIG. 1B, between the stacked optical members near the periphery thereof.

Next, a sealing member 28 was poured over the entire perimeter between the element holder 23 and the peripheral edges of the optical member that were stacked. This sealing member 28 also poured into the gap between the above-described optical members to hermetically seal the space between the diffraction gratings with the element holder in one piece. Then, a ring 25 having the screw thread formed in the peripheral side was screwed with a screw thread 27 provided on the inside of the element holder 23. Furthermore, the optical element was fixed by sandwiching the element between the ring 25 and the step 23a.

In addition, if moisture permeability is at issue, relatively hard material is suitable as the sealing member 28. However, it is required to take measures so that neither peeling nor deformation occurs by selecting a material based on thermal expansion, quality of the holder or the like.

Figure 6:
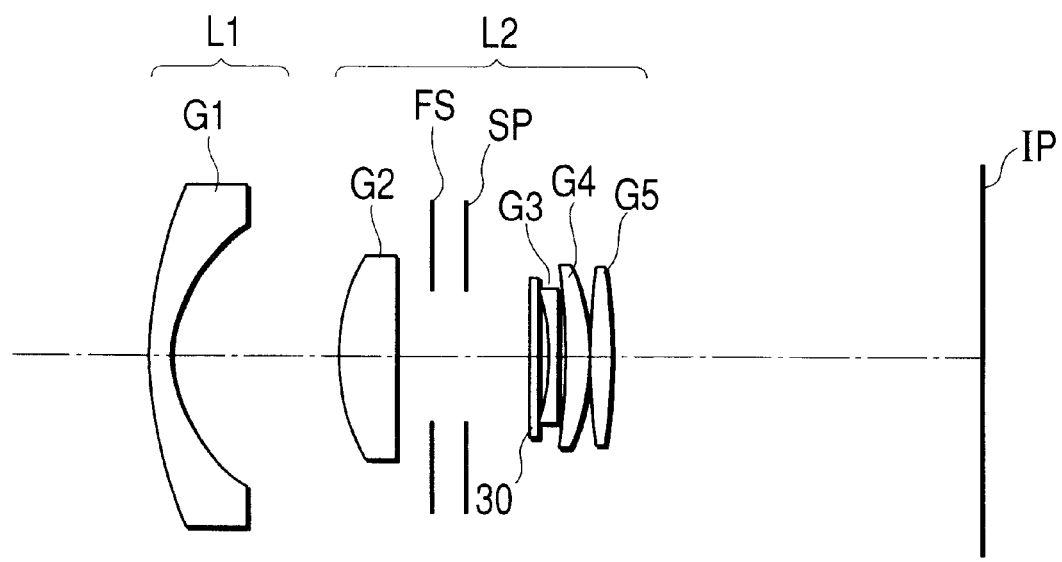
FIG. 6 is a schematic sectional view showing an example of an optical system using a diffraction optical element according to the present invention.

FIG. 6 is a schematic sectional view showing an example of an optical system using a diffraction optical element according to the present invention. In this example, a diffraction optical element is applied to a zoom lens used for a camera.

In the zoom lens shown in FIG. 6, a first lens group L1 having a negative refractive power and a second lens group L2 having a positive refractive power are arranged in this order from a subject side. Symbols FS, SP, and IP are a flare shade, a stop, and an image plane, respectively. Focusing from an infinite object to a short-distance object is performed by moving the first lens group L1 and the second lens group L2 as one body to the subject side. The first lens group L1 consists of meniscus-like negative lenses G1 having a convex face directed to the subject side. On the other hand, the second lens group L2 consists of a positive lens G2 having convex faces at both sides of lens surfaces, a negative lens G3 having concave faces at both sides of lens surfaces, and two positive lenses G4 and G5. Here, on the subject side of the negative lens G3, a diffraction optical element 30 as shown in FIG. 6 is used.

Figure 7:
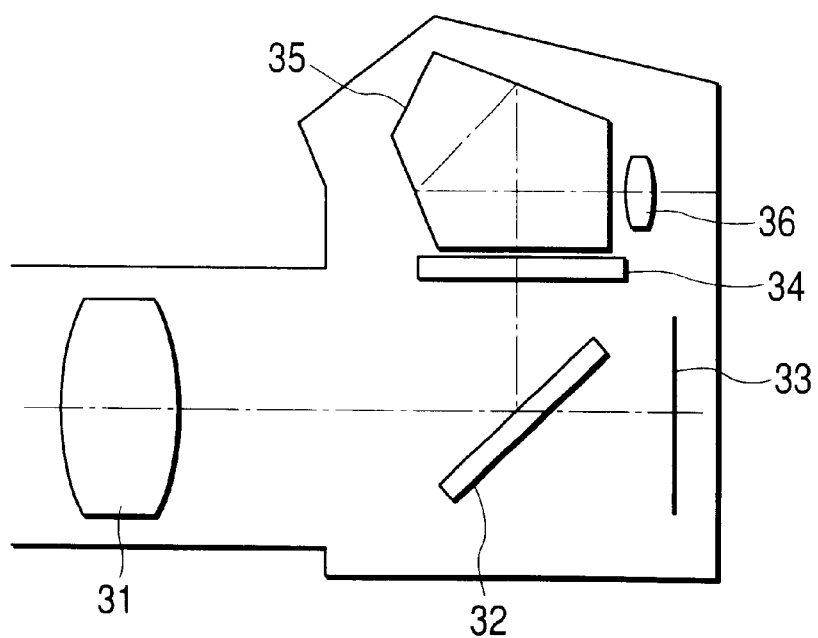
FIG. 7 is a schematic sectional view showing a single-lens reflex camera which is an example of an optical apparatus using an optical system like the optical system shown in FIG. 6.

FIG. 7 is a schematic sectional view showing an example of an optical apparatus. In this example, an optical system equipped with a diffraction optical element of the present invention is applied to a single-lens reflex camera that is one of the image-pickup apparatuses.

In a camera shown in FIG. 7, a main mirror 32 and a film plane 33 are arranged behind an image-pickup lens 31. Then, a focusing board 34 and a pentaprism 35 are arranged in the direction of reflection by the main mirror 32. An ocular 36 is arranged in the direction of reflection by the pentaprism 35. Here, a lens as shown in FIG. 6 is used as an image-pickup lens 31.

Figure 8:
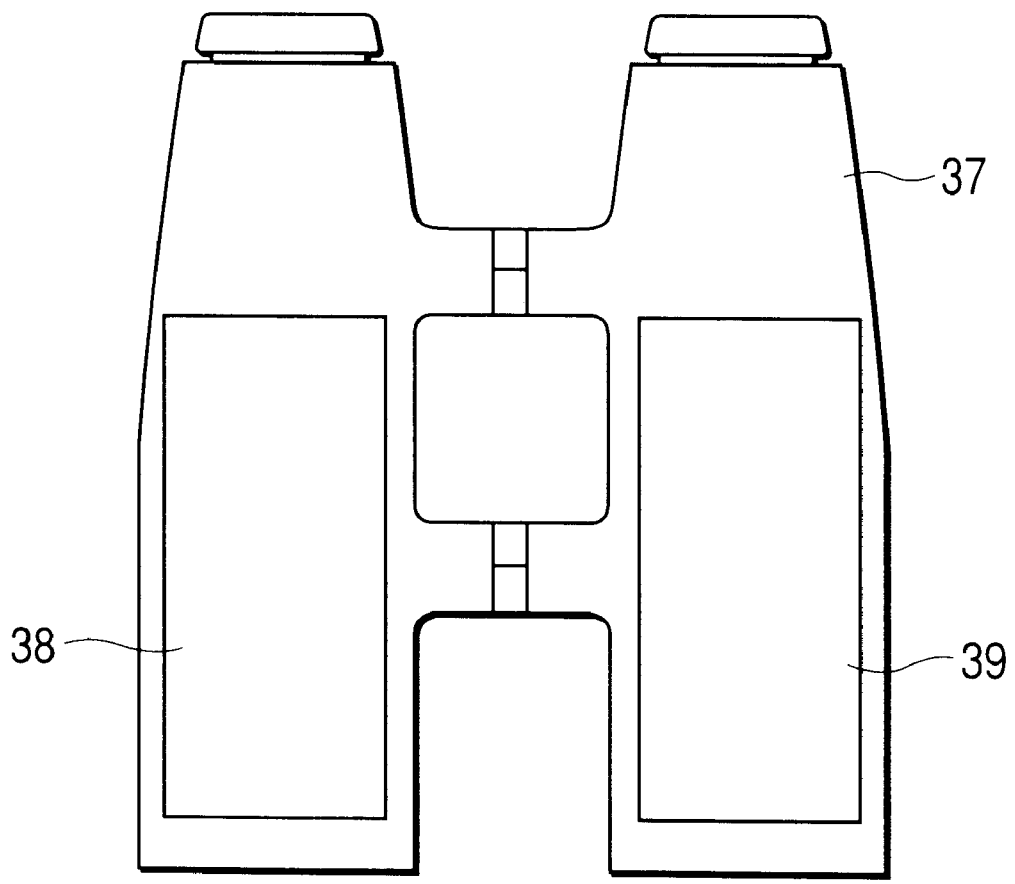
FIG. 8 is a schematic sectional view showing a binocular that is another example of the optical apparatus using an optical system like the optical system shown in FIG. 6.

FIG. 8 is a schematic sectional view showing another example of an optical apparatus. In this example, an optical system equipped with a diffraction optical element of the present invention is applied to a binocular that is one of the observation apparatuses.

In the binocular shown in FIG. 8, a pair of lenses 38 and 39 is attached in a body 37. As each of these lenses 38 and 39, for example, a lens as shown in FIG. 6 is used. That is, in the binocular of this embodiment, the diffraction optical element described above is used for some of the lenses.

The present invention can be applied not only to a single-lens reflex camera described above, but also to other image-pickup apparatuses such as a video camera. Moreover, the present invention can be applied to not only to a binocular described above, but also to other observation apparatuses such as a microscope.

Thus, according to the present invention, it is possible to obtain a diffraction optical element that can respond to changes in the surrounding environment and whose performance degradation is small even if it is used for a long time. The present invention can be also variously modified and it is not limited to the embodiments described above. The present invention includes all such modifications unless they depart from the claims.

What is claimed is:

1. A diffraction optical element comprising:
   a first optical member having a first diffraction grating;
   a second optical member having a second diffraction grating, wherein the first and second optical members are stacked so that the first and second diffraction gratings face each other inside the stacked members and so that a space is formed between the diffraction gratings; and
   a sealing member for hermetically sealing the space between the diffraction gratings,
   wherein a convex part for performing relative positioning with the second optical member is formed in an outer peripheral portion of the first optical member, and a concave part for fitting with the convex part of the first optical member is formed in an outer peripheral portion of the second optical member and
   wherein a gap is provided at an outside of the convex part and the concave part which mutually fit between the first and second optical members, and the gap is filled up with a sealing member.

2. The diffraction optical element according to claim 1, wherein dry air or an inert gas is enclosed in the space between the diffraction gratings.

3. The diffraction optical element according to claim 1, wherein each of the first and second optical members consists of a glass substrate and a resin layer formed on the glass substrate, and wherein the each of diffraction gratings is formed in a surface of each resin layer.

4. The diffraction optical element according to claim 1, wherein at least either of the first and second optical members consists of a lens having a refractive power.

5. The diffraction optical element according to claim 1, wherein the first and second optical members are made of materials whose dispersion mutually differs.

6. An optical system comprising a plurality of optical elements including a diffraction optical element according to claim 1.

7. An optical apparatus forming an image by using an optical system according to claim 6.

8. The optical apparatus according to claim 7, wherein the optical apparatus is an image-pickup apparatus.

9. The optical apparatus according to claim 7, wherein the optical apparatus is an observation apparatus.

10. A method of producing a diffraction optical element, comprising the steps of:
    providing a first optical member having a convex part for performing relative positioning formed in an outer peripheral portion of the first optical member and having a first diffraction grating; and a second optical member having a concave part for performing relative positioning formed in an outer peripheral portion of the second optical member and having a second diffraction grating;
    stacking the first and second optical members so that the convex part and the concave part mutually fit, so that the first and second diffraction gratings face each other inside the stacked members and so that a space is formed between the first and second diffraction gratings, wherein a gap is provided between the first and second optical members at an outside of the convex part and the concave part that mutually fit; and
    hermetically sealing a space between the diffraction gratings by filling up the gap with a sealing member.

11. The method according to claim 10, wherein the step of stacking the first and second optical members is executed under an atmosphere of a dry air or an inert gas.

* * * * *

UNITED STATES PATENT AND TRADEMARK OFFICE
CERTIFICATE OF CORRECTION

PATENT NO.     : 6,523,963 B2
DATED          : February 25, 2003
INVENTOR(S)    : Masaaki Nakabayashi It is certified that error appears in the above-identified patent and that said Letters Patent is hereby corrected as shown below:

<u>Column 1,</u>
Line 62, "measuringly" should read -- increasingly --.

<u>Column 5,</u>
Line 13, "geometric" should read -- geometrical --.

<u>Column 7,</u>
Line 57, "to" should be deleted.

<u>Column 8,</u>
Line 17, "member and" should read -- member, and --; and
Line 27, "the each of" should read -- each of said --.

Signed and Sealed this

Twenty-first Day of October, 2003

JAMES E. ROGAN
*Director of the United States Patent and Trademark Office*